(12) United States Patent
Safaee-Rad et al.

(10) Patent No.: US 8,724,013 B2
(45) Date of Patent: May 13, 2014

(54) METHOD AND APPARATUS WITH FAST CAMERA AUTO FOCUS

(75) Inventors: Reza Safaee-Rad, Etobicoke (CA); Milivoje Aleksic, Richmond Hill (CA)

(73) Assignee: QUALCOMM Incorporated, San Diego, CA (US)

( * ) Notice: Subject to any disclaimer, the term of this patent is extended or adjusted under 35 U.S.C. 154(b) by 643 days.

(21) Appl. No.: 11/964,986

(22) Filed: Dec. 27, 2007

(65) Prior Publication Data

US 2009/0167930 A1    Jul. 2, 2009

(51) Int. Cl.
*G03B 13/00* (2006.01)
*H04N 5/232* (2006.01)

(52) U.S. Cl.
USPC ........................................................ 348/349

(58) Field of Classification Search
USPC ............. 348/349, 353, 354, 355, 356; 396/81
See application file for complete search history.

(56) References Cited

U.S. PATENT DOCUMENTS

| 7,262,798 | B2 * | 8/2007 | Stavely et al. | 348/255 |
| 7,847,854 | B2 * | 12/2010 | Okawa et al. | 348/345 |
| 2003/0123865 | A1 * | 7/2003 | Hofer et al. | 396/72 |
| 2004/0135903 | A1 * | 7/2004 | Brooks et al. | 348/231.99 |
| 2005/0128340 | A1 * | 6/2005 | Ikeda | 348/345 |
| 2006/0146165 | A1 * | 7/2006 | Hagiwara et al. | 348/333.01 |
| 2007/0188652 | A1 * | 8/2007 | Yuyama | 348/372 |
| 2008/0232680 | A1 * | 9/2008 | Berestov et al. | 382/154 |

OTHER PUBLICATIONS

Xiong, Yalin et al.; Depth from Focusing and Defocusing; The Robotics Institute; Mar. 1993; pp. 1-23.
Zigler, Gernot, "MPEG Z/ALPHA presentation," pp. 1-39. (created Mar. 10, 2009).

* cited by examiner

*Primary Examiner* — Albert Cutler
(74) *Attorney, Agent, or Firm* — James R. Gambale, Jr.; Timothy F. Looms

(57) ABSTRACT

A method and apparatus improves an auto focus system by altering, such as by positioning, at least one lens of a digital camera to a plurality of predetermined nonuniform lens positions corresponding to predetermined nonuniform lens position data. The method and apparatus selects a final lens position for the lens based on the predetermined nonuniform lens position data. In one example, a fixed number of predetermined nonuniform lens positions define a set of lens positions used to capture images during an auto focus operation. A final image is captured using a final lens position. The final lens position is determined by comparing focus metric information from each of the frames obtained at the various predetermined nonuniform focus lens positions and selecting the frame with, for example, the best focus metric as the lens position to be used for the final picture or image capture.

19 Claims, 10 Drawing Sheets

METHOD AND APPARATUS WITH FAST CAMERA AUTO FOCUS

RELATED CO-PENDING APPLICATIONS

This application is related to co-pending application Ser. No. 11/964,992, entitled "METHOD AND APPARATUS WITH DEPTH MAP GENERATION", filed on Dec. 27, 2007, the entire content of which is incorporated herein by reference.

BACKGROUND OF THE INVENTION

Digital cameras that employ fixed focal length lenses are used in mobile devices such as cell phones, laptops and other devices. Such cameras have a wide angle lens that results in a short and fixed focal length. Auto focus operations are known wherein a user of the cell phone or digital camera may hold down a push button halfway to auto focus an image whereafter the user may then continue to press the button to the fully pressed position to capture the final image. However, known auto focus operations may move the lens in a uniform manner such as every 25 positions throughout its range of, for example, 255 positions and capture an image at every uniform lens position of 25 positions resulting in the processing of 10-12 frames. Capturing 10 or so images from which the auto focus algorithm determines the best image can result in power drain for the mobile device and over time drastically impact battery usage. In addition, if the flash is used to take the final image, when a flash may not actually be necessary or useful, the additional power drain can degrade the performance of the mobile device. In addition, with the uniform focus lens position scheme, 10 or 12 frames may be taken which requires the device to capture and process many frames for the auto focus determination. This can require additional processing time and the user may have to wait an unnecessary amount of time for the auto focus operation to be completed.

It is also known to use nonuniform lens positions as part of an autofocus process. For example, to find the best lens position, various auto-focus searching strategies can be used. These methods determine how the lens position is updated (by how much and in which direction). The searching method can affect the speed and accuracy of auto-focus process. The set of lens positions used to find the best lens position could be based on non-uniform (or uniform) intervals. Non-uniform lens positions are typically established dynamically on the fly based on a determined rate of change of focus-metric values. That is, if the rate of change of focus-metric value is determined by a process in the device to be high, shorter lens position intervals are used while if the rate of change of focus-metric value is low, longer intervals are used. However, it can be difficult to determine the rates of change and then determine a suitable interval to use.

Improving auto focus speed and reducing power drain on mobile devices or non-mobile devices is extremely important, particularly as mobile device usage increases drastically. The need for such improvements have existed for many years. However, known current solutions still can require unnecessary amounts of time and/or power consumption.

As to depth map generation, multi-camera image processing systems (e.g., a calibrated stereo vision system) may employ multiple cameras each employing a lens to generate an image depth map that includes regions of interest of a field of view to be used for different applications such as in automated-vehicle guidance systems for guiding vehicles. Generating depth maps using such systems can result in a highly complex and expensive process requiring multiple pre-calibrated cameras. However, a need also exists for simpler depth-map generation (e.g., segmenting the field of view into foreground and background) to be used for improving various digital camera functions/operations such as a more effective use of flash/no-flash selection, better exposure estimation, more effective white balancing and improved color-correction-matrix selection.

BRIEF DESCRIPTION OF THE DRAWINGS

The invention will be more readily understood in view of the following description when accompanied by the below figures and wherein like reference numerals represent like elements, wherein.

DETAILED DESCRIPTION OF THE PREFERRED EMBODIMENTS

Figure 1:
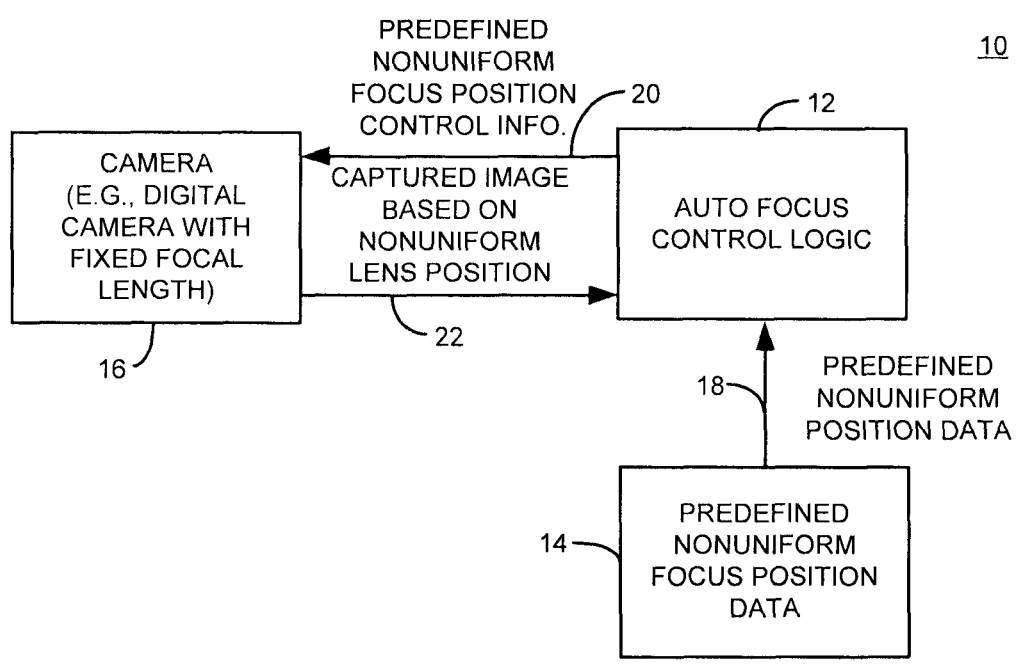
FIG. 1 is a block diagram illustrating one example of an auto focus circuit in accordance with one embodiment of the disclosure.

Generally, a method and apparatus improves an auto focus system by altering, such as by positioning, at least one lens of a digital camera to a plurality of predetermined nonuniform lens positions corresponding to predetermined nonuniform lens position data, and selecting a lens position for the lens based on the predetermined nonuniform lens position data. The predetermined nonuniform lens position data may, for example, predetermined and may be stored in memory, may be provided through a resistive array, or may be provided in any suitable manner. The predetermined nonuniform lens position data represents a minimum number or set of optimal lens positions that can be used to focus to take a final image, that are determined apriori and are based on optical characteristics of the specific camera lens. In one example, the data represents, empirically obtained information corresponding to lens position versus an object distance from a point of reference (e.g., points along a characteristic curve of optimal lens positions vs. object distance for a fixed focal length lens). In one example, a fixed number of predefined nonuniform lens positions define a set of optimal nonuniform lens positions used to capture images during an auto focus operation. A final image is captured using one of these predetermined nonuniform lens positions. A best focus lens position from the set of predetermined nonuniform lens positions is determined by comparing focus metric information from each of the frames obtained at the various nonuniform focus lens positions and selecting the frame with, for example, the best focus metric as the lens position to be used for the final picture or image capture. The focus metric information may be generated on a per-frame basis or per-region of interest basis as desired.

Among other advantages, a faster auto focus process may result and a fewer number of images need be obtained to determine the best lens position compared to systems that employ, for example, uniform lens position based image sampling. Also, using a set of predetermined nonuniform lens positions removes the need for any dynamic nonuniform lens position determination and interval determination process. As such, using fewer frames of images obtained from one or more of the set of predetermined nonuniform lens positions can speed up the auto focus process so that a user need not wait as long until an image is captured, and can result in a lower power consumption of the battery of the device thereby improving performance.

In another embodiment, an apparatus and method are disclosed wherein a depth map is generated using a single camera (e.g., single lens of a camera) and multiple images are captured by the camera. In one example, a single digital camera is used to capture a set of images corresponding to a set of lens positions based on lens position data. In this example, the lens position data may be either uniform or nonuniform lens position data. The method and apparatus determines focus metric information for each of a plurality of regions of interest in each image of a set. A determination is made of a best lens position for each of the regions of interest based on the focus metric information from the images in the set and are stored as data in a depth map. Image generation operations are then performed based on the generated depth map, such as determining whether or not to use a flash to capture a final image, to determine a type of color operation to be performed on the final image, or any other suitable image generation operation. In one example, the depth map is generated by selecting a best focus metric among the various images that were captured for a particular region of interest. Once the depth map is generated using data from the multiple images, depth map based control logic then determines how to use the depth map to effect an image processing operation.

Among other advantages, multiple cameras need not be employed nor do external light sensors need be employed to generate a depth map for use in image processing operations. Other advantages will be recognized by those of ordinary skill in the art.

As used herein, the terms "module," "circuit," "logic," "driver," and/or "stage" can include an electronic circuit one or more processors (e.g., shared, dedicated, or group of processors such as but not limited to microprocessors, DSPs, or central processing units) that executes one or more software or firmware programs stored in memory, combinational logic circuits, ASICs and/or other suitable components that provide the described functionality.

FIG. 1 illustrates an apparatus 10 that includes a circuit shown as auto focus control logic 12, memory 14 containing predetermined nonuniform lens position data 18 and a camera 16 such as a single digital camera with a fixed focal length lens. However, any suitable camera may be employed. The apparatus 10 may be, for example, a cell phone with a digital camera integrated therein, a handheld digital camera, or any suitable device that employs a digital camera or connects with a digital camera either directly or indirectly. The auto focus control logic 12 may be implemented as any suitable structure including, but not limited to, discrete logic, one or more processors that execute stored computer readable instructions, or any other suitable structure. The memory 14 may be RAM, ROM in any suitable form such as registers, addressable memory, or may be any other suitable memory including host system memory, local cache memory or any other suitable memory as desired. The predetermined nonuniform lens position data 18 may also be provided in the form of a resistor array that provides voltage levels to an input port to, for example, an integrated circuit indicating nonuniform lens position data for a given camera. Each manufacturer of a digital camera may have different characteristics and as such, differing predetermined nonuniform lens position data may be employed depending upon the particular camera being used.

Figure 2:
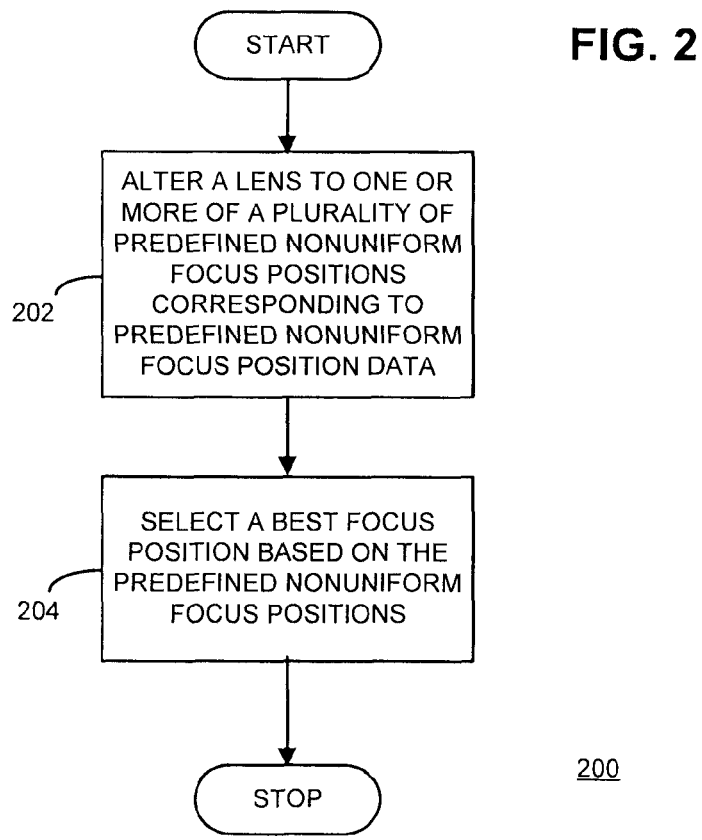
FIG. 2 is a flowchart illustrating one example of a method for improving an auto focus system in accordance with an example set forth in the disclosure.
Figure 3:
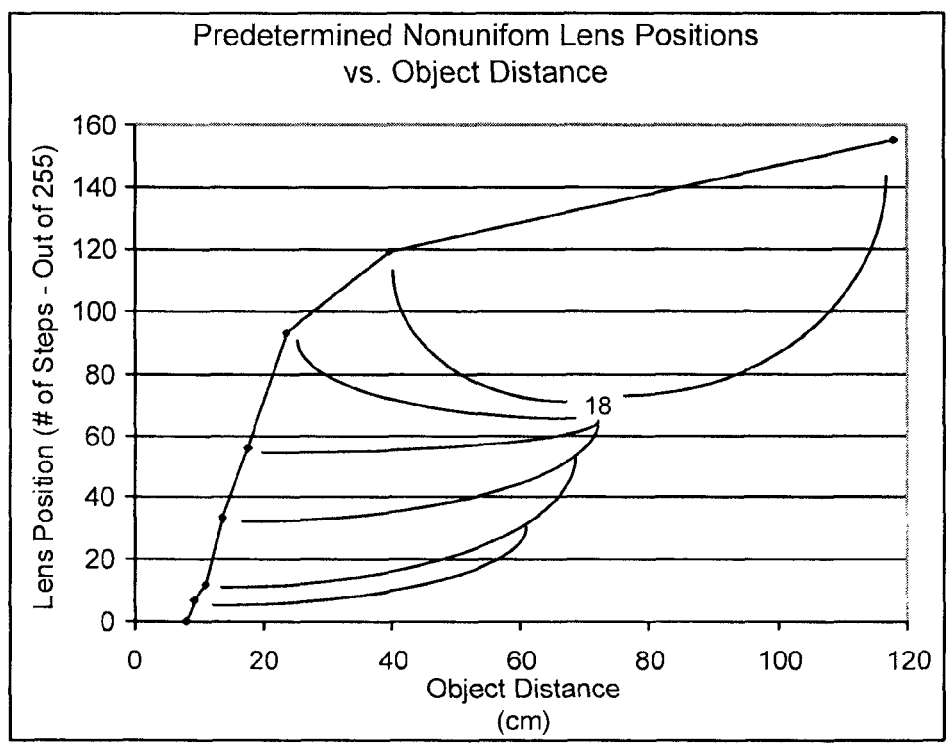
FIG. 3 is an illustration showing one example of predetermined nonuniform focal position data in accordance with one embodiment set forth in the disclosure.

Referring also to FIGS. 2 and 3, a method that may be carried out, for example, by the auto focus control logic 12 and apparatus 10 is illustrated. In addition, a graphic illustration shows the predetermined nonuniform lens position data 18 (the eight non-zero dots), the values of which may be stored in the memory 14 or provided via a resistor array or in any other suitable manner. This information may be obtained apriori through empirical testing of the camera 16 in the apparatus 10 or may be obtained in any other suitable manner. As such, the data may be downloadable via the Internet or other network or may be stored in the EEPROM such as memory 14 or provided to the auto focus control logic 12 through any suitable manner. As shown, the predetermined nonuniform lens position data 18 represents, for example, a lens position in terms of a number of steps such as a number of positioning steps out of 255 total, and the determined object distance from the camera at a given lens position where the object is in focus at those positions. By way of example, a predetermined nonuniform lens position of approximately 155 is shown to be used if the object distance is 118 cm from the camera. It has been found that the closer an object is to the camera, that 4 lens positions need to be utilized for an auto focus operation. For example if the object distance is 100 cm, the 5th lens position is used.

Referring to FIG. 2, the method includes as shown in step 202, positioning or altering the lens of the camera 16 to a plurality of nonuniform lens positions corresponding to the predetermined nonuniform lens position data 18. As such, the auto focus control logic 12 sends predetermined nonuniform lens position control information 20 to the camera 16 to, for example, position the camera that then captures the image when the lens is at this position and communicates back the captured image or frame 22 obtained when the lens was at one of the nonuniform lens positions 18. Each received captured image is then analyzed by the auto focus control logic 12 to determine on a frame basis or a subframe basis, image sharpness metric information such as a value that indicates how sharp the image is at the given lens position. This information for a given image may then be stored in memory temporarily. The auto focus control logic then moves the lens to a next desired lens position using predetermined nonuniform lens position control information 20 and another image is captured by the camera 16 at this lens position. Sharpness image metric information for that new frame is then obtained and compared with the previous image focus metric of the previous image. If it is determined to be a sharper image, then it is stored for comparison to a next captured image. The process is then continued for each desired nonuniform lens positions identified by the predetermined nonuniform position data 18 depending on whether the auto focus process is using a hill climbing method, a full search method or other method. As shown in block 204, the method includes selecting an optimal lens position based on the nonuniform lens positions by, for example, choosing the lens position that generated the frame with the best image sharpness metric. This lens position is then used as the lens position to capture the final image that the user wishes to capture. The predetermined nonuniform lens position data 18 may be stored, for example, as a lookup table in memory 14 to be used during the online auto focus process.

Compared to other known systems, the above process can result in a faster auto focus process since a maximum of only 7 or 8 frames (one at each nonuniform lens position) need be captured or evaluated as opposed to, for example, a maximum of 11 which may be typical for an auto focus system that uses uniform lens positions, such as every 25 steps. This can also result in less power consumption since fewer frames are captured and analyzed as part of the auto focus process. Other advantages will be recognized by those of ordinary skill in the art.

It will be recognized that the predetermined nonuniform position data 18 may be obtained in any suitable manner. One technique may be to establish an acceptable size of a circle of confusion, for example, for cell phone cameras or other cameras with fixed focal lengths. Different camera manufacturers may have a differing circle of confusion (in diameter microns). This information may be provided by the manufacturers or determined through experimentation as known in the art. The depth of field versus lens position may also be determined and focus distances that have their depth of field overlap to cover a full focus range are used as the nonuniform lens positions. For example, for a lens (sensor) having a size of 5.6 mm×4.2 mm, the lens focal length may be 5.6 mm and the circle of confusion size may be estimated to be 9.5 microns. A hyper focal length of 1,179 mm may be used. As such, the optimal lens positions are shown in FIG. 3 identified by the predetermined nonuniform position data 18. The nonuniform lens position data 18 represents nonuniform lens positions (or movement steps) associated with a lens characteristic curve as shown, for example, in FIG. 3.

As one example, the predetermined nonuniform lens positions (and hens corresponding data 18) of FIG. 3 can be established as follows for a cell phone camera.

| Sensor size: | 3.2 MP with 2.7 micron pixel size |
| Lens: | focal length: 5.6 mm |
| | Fixed aperture: 2.8 (F number) |
| CoC diameter: | 9.5 microns |

The measured resolution for this cell-phone camera at 30% relative contrast is MTF30=0.283 Cycles/Pixel. Then the diameter of Circle of Confusion (CoC) will be equal to 9.5 microns based on the measured MTF30.

Using the above information (F number, focal length and CoC diameter), depth of field (DOF, Rear and Front) can be calculated for each object distance. That is, for each lens position, a range of object distances in focus is estimated. If the selected object distances are such that their range of object-distances-in-focus are overlapping, these are designated as the minimum number of nonuniform lens positions. The following Table I shows the selected object distances (first column) and their corresponding range of object-distances-in-focus (fourth column). Then the corresponding lens positions (fifth column) can be established (i.e., by placing an object at each of object distances—the first column—and finding the optimal lens position through auto-focus process). As an example, all objects at distances 153 mm to 205 mm will be in focus when we place the lens at position 56. Another example, lens position 93 will cover all objects with distances 204 mm to 297 mm and so on.

The last object position (1179 mm) in the table is called hyper-focal length which covers the largest range of object distances in focus: from 590 mm to infinity. That is, if we place the lens at position 155, all objects that are placed between 590 mm to infinity are in focus.

TABLE I

| Object Distance (mm) | Depth of Field Front (mm) | Depth of Field Rear (mm) | Object Distances in focus (mm) | Lens Position (step) | Total DOF (mm) |
|---|---|---|---|---|---|
| 81 | 5.2 | 6.0 | 76 to 87 | 0 | 11 |
| 94 | 6.9 | 8.1 | 87 to 102 | 7 | 15 |
| 111 | 9.6 | 11.5 | 102 to 122 | 12 | 20 |
| 136 | 14.1 | 17.7 | 122 to 153 | 33 | 31 |
| 175 | 22.6 | 30.5 | 153 to 205 | 56 | 52 |
| 237 | 39.7 | 59.6 | 204 to 297 | 93 | 93 |
| 395 | 99.1 | 199.0 | 296 to 594 | 119 | 298 |
| 1179 | 589.5 | 188629221.1 | 590 to infinity | 155 | infinity |

The above example shows that:

Only 8 NON-UNIFORM lens positions (0, 7, 12, 33, 56, 93, 119 and 155) can be used instead of for example 11 uniform lens positions (0, 25, 50, 75, . . . , 250) during auto-focus process. That is a significant reduction of lens positions for auto-focus process.

As expected, majority of lens positions are related to object at short distances (i.e., 80 mm to 600 mm). In fact, higher number of lens positions for short-distance objects provides a more reliable focus position determination since depth of field is very narrow/shallow under short distances.

To even further reduce the number of lens positions for auto-focus operation, three modes can be used:

(a) Macro mode: object at short distances (80 mm to 600 mm);

(b) Landscape mode: objects at long distance (greater than 600 mm);

(c) Normal mode: The default mode will cover the whole range (80 mm to infinity).

Figure 4:
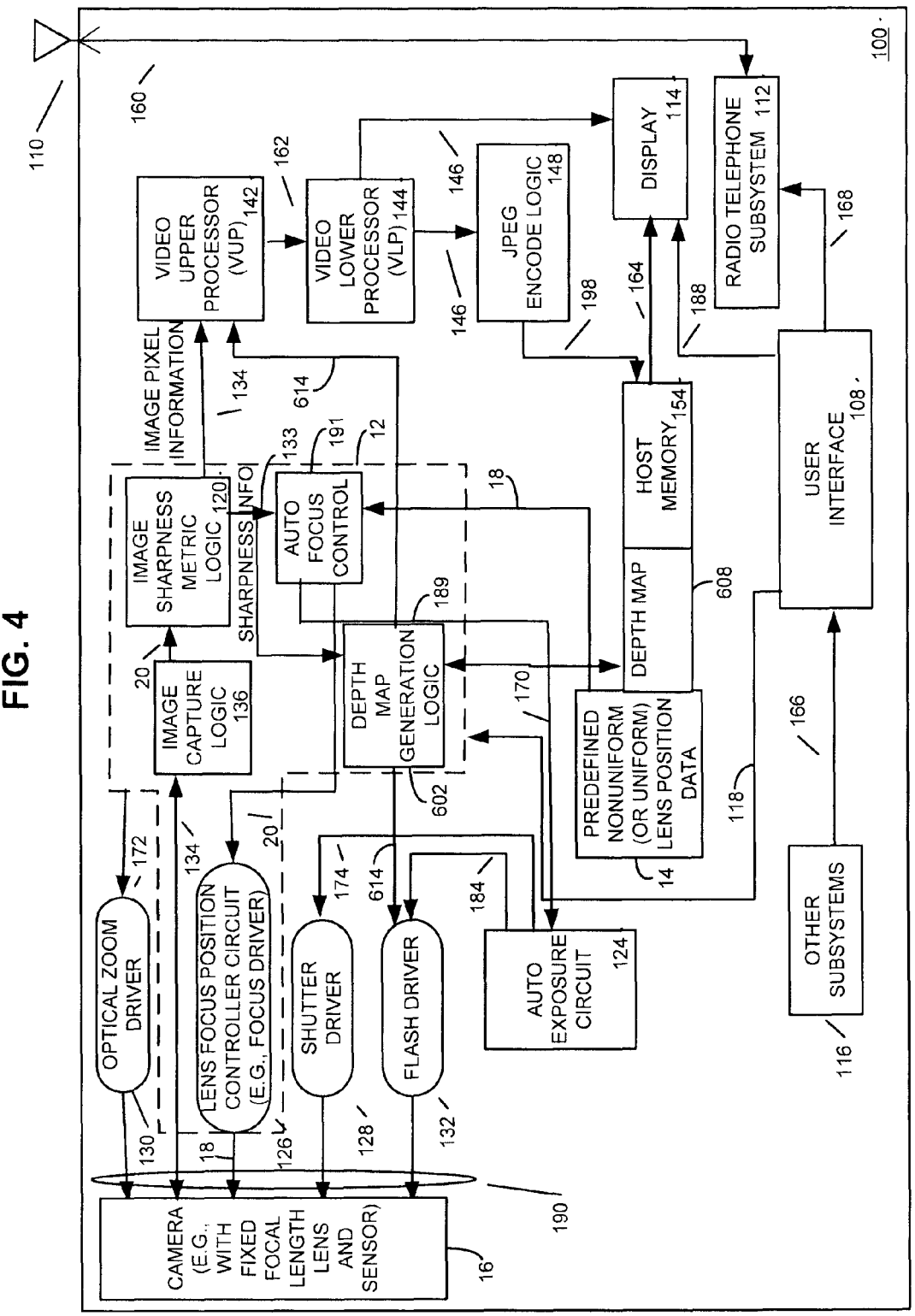
FIG. 4 is a block diagram illustrating one example of a mobile device in accordance with one example in the disclosure.

FIG. 4 illustrates a block diagram exemplifying one example of a handheld device 100, including the camera 16. The handheld device 100 may be a mobile phone, personal digital assistant ("PDA"), portable audio or video player, or other mobile devices with a camera accessory. The camera 16 as recognized in the art is typically a digital camera containing a charge-coupled device ("CCD") image sensor or a complementary metal oxide semiconductor ("CMOS") image sensor with a fixed focal length lens. However, any camera capable of the limited size and power consumption requirements of a handheld device may also be used.

In one example, the handheld device 100 may be a mobile phone and include an antenna 110 to transmit or receive a radio signal 160 to or from a radio telephone subsystem 112 as known in the art. A user interface 108 provides for a user to access the features of the handheld device 100, such as operating an interface signal 168 to the radio telephone subsystem 112, or initiating the capture of an image with camera 16 through a shutter button signal 118. The user interface 108 typically connects the user to the handheld device 100 with a combination of components such as, but not limited to, keypads, buttons, and feedback 188 through display 114. It is recognized other user interface mechanisms, such as voice recognition and touch-screens, are widely available and known in the art and one having ordinary skill in the art will recognize any user interface suitable for a handheld device may be used. Display 114 may be any display suitable for handheld applications, such as, but not limited to, LCD (Liquid Crystal Display), LCD-TFT (LCD-Thin Film Transistor), OLED (Organic Light Emitting Diode), and FED (Field Effect Display). Alternatively, other subsystems 116 may be provided to connect to the user interface 112 via a system bus 166. Other subsystems 116 may include, but are not limited to: audio players, video players, personal information managers ("PIMs"), voice recorders, internet access, or messaging applications In one example, a user initiates capturing of an image on the handheld device 100 through the user interface 108. For example, a half-press of a designated button may cause shutter button signal 118 to initiate an auto-focus routine, or a full-press may initiate an auto-focus routine that automatically moves to a next step of the image capturing process to capture a final image that may be stored in memory, and/or displayed as display data 164. Additionally, user interface 108 may provide for a full-press of a designated button to capture a picture and may deactivate the full-press function until after a half-press auto-focus routine has been completed. In the example of FIG. 4, the shutter button signal 118 is received by the autofocus control logic 12. It will be recognized that any functions may be combined, such as the image sharpness metric logic and the capture logic 136 or other suitable operations.

As stated above, a series of images are captured at varying nonuniform lens positions and analyzed by the auto-focus control logic 12. The auto-focus control logic 12 transmits predetermined nonuniform control information 20 to the focus driver 126 which transmits nonuniform lens position data 18 to camera 16 through camera interface bus 190. In addition, auto exposure circuit 124 transmits shutter driver signal 174 to shutter driver 128 which transmits an open and close shutter command to camera 16 through camera interface bus 190 in order to capture images. An autofocus controller 191 generates auto exposure control signal 170 to activate the auto exposure operation. In the present example, camera 16 is also connected to an optical zoom driver 130 and a flash driver 132 through camera interface bus 190 and controlled by optical zoom driver signal 172 and flash driver signal 184, respectively. Optical zoom drivers and flash drivers are well known in the art. However, it is recognized that the present invention may be implemented without the optical zoom driver 130 or flash driver 132 or other functions shown. In an optical zoom operation is used, predefined lens positions should be determined for each lens focal length.

In one example, after information is transmitted to the focus driver 126 and shutter driver 128, an image is captured by camera 16 and image pixel information 134 is sent from camera 16 to image capture logic 136. As known in the art, image capture logic 136 sets gains etc. for the image sensor of the camera and receives pixel information capture by the sensor. It will be recognized by one having ordinary skill in the art that the image capture logic 136 may be implemented in a variety of ways and located within circuits other than the auto-focus control logic 12. The image pixel information 134 is transmitted to the image sharpness metric logic 120 where image sharpness metric information 133 of the ROI or entire image are calculated. For example, the image may be divided into regions of interest (ROIs) and statistical analysis performed on each ROI in series or in parallel. The pixel information may be scanned across the horizontal dimension of the image such that all ROIs in a row are processed simultaneously. It will be recognized by one having ordinary skill in the art that image sharpness metric information 133 may be determined using a variety of methods. As one example, an energy of Laplacian method (Squared Laplacian) can be used that calculates the metric information using the squared Laplacian g(x,y) of an image. In this example:

Image Sharpness Metric Information is represented as a metric=$\Sigma_x \Sigma_y [g_{xx}+g_{yy}]^2$ where $g_{xx} = \delta^2/\delta x^2$, and $g_{yy} = \delta^2/\delta y^2$.

A discrete Laplacian is approximated by the following kernels which include only vertical and horizontal neighbors:

$$\begin{matrix} 0 & 1 & 0 \\ 1 & -4 & 1 \\ 0 & 1 & 0 \end{matrix}$$

or $$\begin{matrix} 0 & -1 & 0 \\ -1 & 4 & -1 \\ 0 & -1 & 0 \end{matrix}.$$

To be more exhaustive, the following Laplacian kernels which include the diagonal neighbors can be used:

$$\begin{matrix} 1 & 1 & 1 \\ 1 & -8 & 1 \\ 1 & 1 & 1 \end{matrix}$$

or $$\begin{matrix} -1 & -1 & -1 \\ -1 & 8 & -1 \\ -1 & -1 & -1 \end{matrix}.$$

In situations where hardware limitations preclude use of the above kernels, a Laplacian operator in only one direction, such as horizontal along the pixel scanning, can be used:

Metric=$\Sigma_x[g_{xx}]^2$

As a result, the following Laplacian kernels along horizontal direction are to be used:

1  −2   1 or

−1   2  −1

The calculation of a metric for an image using a Laplacian operator horizontally along the pixel scanning thus becomes:

Metric=$\Sigma[(P_{i-1}-2*P_i+P_{i+1})*(P_{i-1}-2*P_i+P_{i+1})]$.

where $P_i$ is the value of the current pixel, $P_{i-1}$ is the value of the previous pixel and $P_{i+1}$ is the pixel value of the next pixel.

Another example of determining metrics is the energy of the Gradient of an image. The energy of Gradient of an image is defined as the square of Gradient of the image g(x, y) where:

Metric=$\Sigma_x\Sigma_y[g_{x,+}g_y]^2$ where
$g_x=\delta/\delta x$,
$g_y=\delta/\delta y$.

The discrete energy of Gradient along the horizontal direction is expressed as follows:

Metric=$\Sigma[(P_{i+1}-P_i)*(P_{i+1}-P_i)]$.

A metric of an image as defined above is a measure of the relative sharpness of an image. A focus metric and image sharpness metric may be calculated in the same manner.

The video upper processor (VUP) 142 as known in the art is a single pixel per clock processor that receives the image pixel information 134. One having ordinary skill in the art will recognize the image pixel information 134 may be sent to the VUP 142 by the image sharpness metric logic 120 as shown, or the image pixel information 134 may be directly received from another circuit or logic such as image capture logic 136. In one example, image processing is further executed by transmitting an intermediate processed image pixel information 162 to a video lower processor (VLP) 144. The VLP 144 uses a multiple pixel per clock processor as known in the art. Because the VUP 142 and VLP 144 are both processors, their image processing functions may be performed by one processor, or more than two processors as the application dictates. In other examples, a processor may be, but is not limited to, a field-programmable gate array (FPGA), a digital signal processor (DSP), an ASIC, a microprocessor or central processing unit (CPU), a microcontroller, a state machine, or any combination thereof on a single integrated circuit or multiple integrated circuits. In one example, the processed image pixel information 146 is encoded into an industry standard JPEG (Joint Photographic Experts Group) format in the JPEG encode logic 148 and transmitted on memory bus 198 to be stored in memory 154. Alternatively the processed image pixel information 146 may be displayed on display 114 either concurrently with the JPEG encoding at the JPEG encode logic 148, at a time before or after JPEG encoding, or displayed without JPEG encoding.

In this example, the auto focus control logic 12 includes the lens position controller circuit or focus driver 126, the image capture logic 136, the image sharpness metric logic 120, a depth map generator 189 and auto focus control logic 191.

However, it will be recognized that any suitable combination of functions may be used as the auto focus control logic. For example, the image capture logic 136 may be embedded as part of the camera 16 and other functions may be suitably combined as desired. The focus driver is a hardware driver that moves the lens as known in the art. The auto focus control logic 12, for example, selects the optimal lens position for the lens to be used after the auto focus process to take the final image, such as when the user fully depresses a capture button.

For example, the auto focus control circuit 191 may obtain first predetermined nonuniform lens position data 18 such as a lowest stored position and provides predetermined nonuniform lens position information 20 to the lens position controller circuit 126 to cause the fixed focal length lens to move to that first position. The frame is then captured and passed to the image capture logic 136 for processing as known in the art. The image sharpness metric logic 120 determines the focus metric information (the image sharpness information 133) of the image and stores the focus metric information 133 as preliminary optimal focus metric information. It may store this information in a cache memory or any other suitable memory such as that accessible by the auto focus control circuit 191. The auto focus control circuit 191 may then, for example, determine a next lens position namely the next nonuniform position indicated by the predetermined nonuniform focal position data 18 stored in memory 14 to capture a next image. The image sharpness metric logic 120 then determines the focus metric information of the next image. This is provided, for example, to the auto focus control circuit 191 which then compares the stored preliminary optimal focus metric information and the next focus metric information of the two frames and retains the best or preferred metric of the two as the new preliminary optimal focus metric information. This process is repeated for all nonuniform lens positions: in this example 8 lens positions as shown in FIG. 3. As such, the lens is altered or moved to varying predetermined nonuniform optimal lens positions. Once all the nonuniform lens positions have been used to obtain an image and all the focus metric information has been calculated, the auto focus control circuit then chooses the lens position having the best focus metric information as the position for capturing the final image once the user fully presses the picture button.

Figure 5:
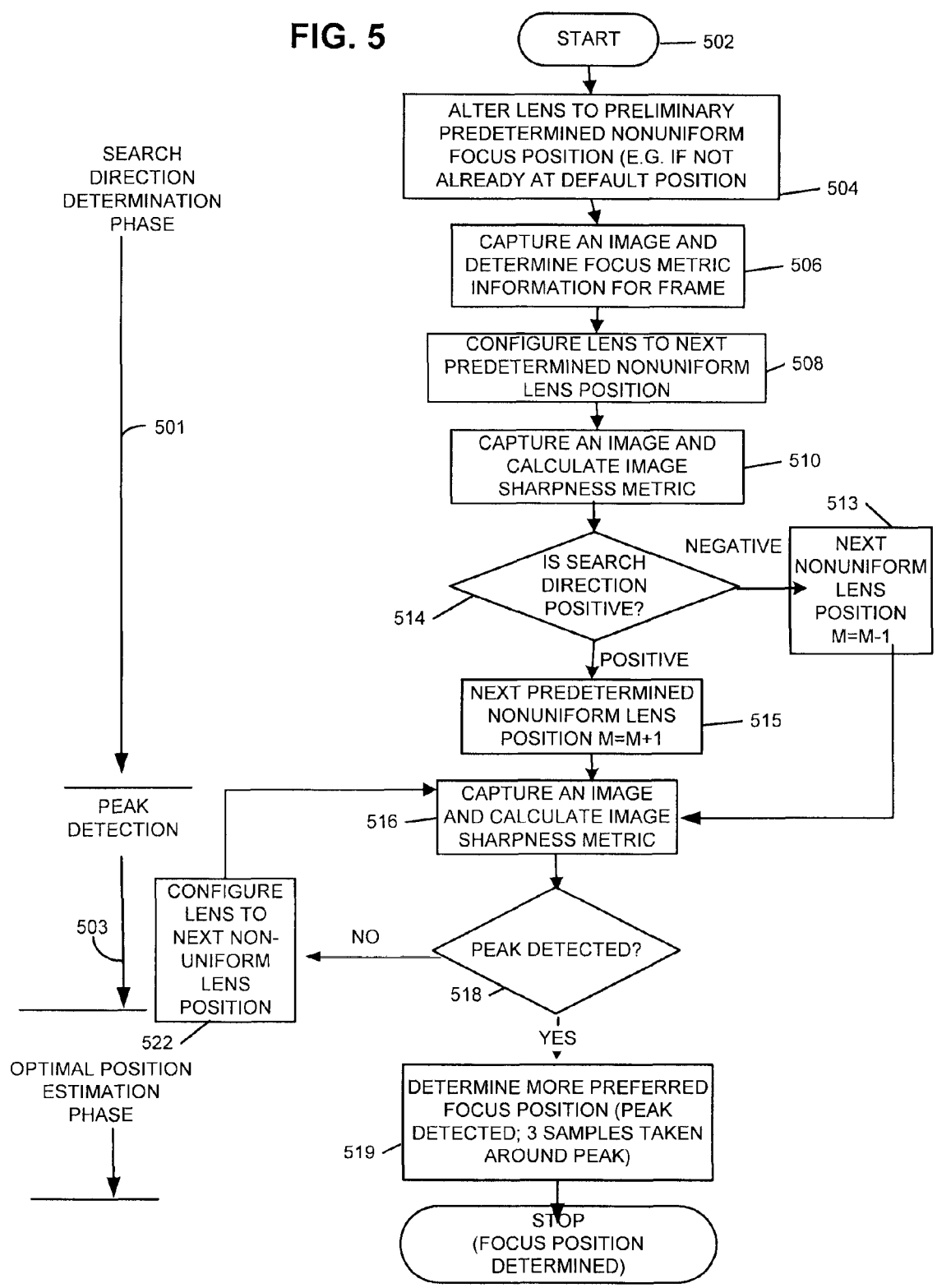
FIG. 5 is a flowchart illustrating one example of a method for improving an auto focus system in accordance with one example set forth in the disclosure.

FIG. 5 illustrates a hill climbing method that may be used which shows different stages of the process such as a search direction determination phase 501, a peak detection phase 503 where the peak detection phase of the process is used to determine the best nonuniform lens position to use as the final lens position to take the final picture. As shown in block 502, the method begins by, for example, detecting that a user has half pressed a picture select button or otherwise indicated the auto focus process. As shown in block 504, the method includes altering a lens to a preliminary optimal lens position as determined by the predetermined nonuniform lens position data 18. As shown in block 506, the method includes capturing the image and determining the focus metric information for that image or frame and configuring the lens to a next lens position as shown in block 508. As shown in block 510, the method includes capturing an image and calculating the image sharpness metric for the frame obtained at the new nonuniform lens position. As shown in block 514, a determination is made as to the position search direction. For example, a determination is made such as by the auto focus control circuit 191 whether the search direction is positive or negative; positive (going from 0 to 255) indicating that it is a lens position corresponding to an object that is further away and a negative position indicating that the lens position is for an object closer If the process uses a positive search direction as shown in block 515, the method includes incrementing the lens position or shown in block 513, if it is in a negative direction then decrementing the lens position. As shown in block 516, the lens is moved to the next location and a next image is captured and the image sharpness metric is determined. As shown in block 518, the method includes determining whether a maximum focus metric (e.g., peak lens position) has been found by performing a neighborhood search. Peak detection is based on detecting a rise and a fall in focus-metric (FM) values for three neighboring lens positions. For example:

1st Lens position 75: FM value=1000
2nd Lens position 100: FM value=1200
3rd Lens position 125: FM value=830

This pattern of rise and fall is an indication of a peak in the focus-metric value. Thus, the logic concludes that the best focus is at (or near) lens position 100. As shown in block 519 the method includes determining an optimal lens position. It has been found that the behavior of focus-metric values can be modeled around the best focus lens position by a parabolic curve (i.e., a 2nd-order polynomial) and based on that the "true/best" peak in focus-metric value is estimated and its corresponding lens position is used. For the above case, the optimal focus-metric value is estimated to be 1206 at lens position of 96.

If no peak is detected, a next position is used as shown in block 522. As noted above, among other advantages, it has been found that objects at short distances use more nonuniform lens positions or frames from those positions to establish a best focus lens position resulting in a better final image. In addition, a fewer number of frames need to be used is the total range of distance is used to detect a best or final lens position for an auto focus operation. Battery power is also reduced since fewer frames are captured and processed. Also, in one example, the set of predefined nonuniform lens positions have the following features: pre-defined, non-uniform (e.g., not fixed number of position apart, such as every 10 positions, and shorter intervals are used for short object distances and longer intervals are used for long object distances. There are a minimum number in the set, and the set includes the hyper-focal length lens position which has the largest depth of field and can be used as the default (i.e., initial) lens position since it covers the largest range for of object distances in focus and thus statistically is the most probable focus lens position.

Figure 6:
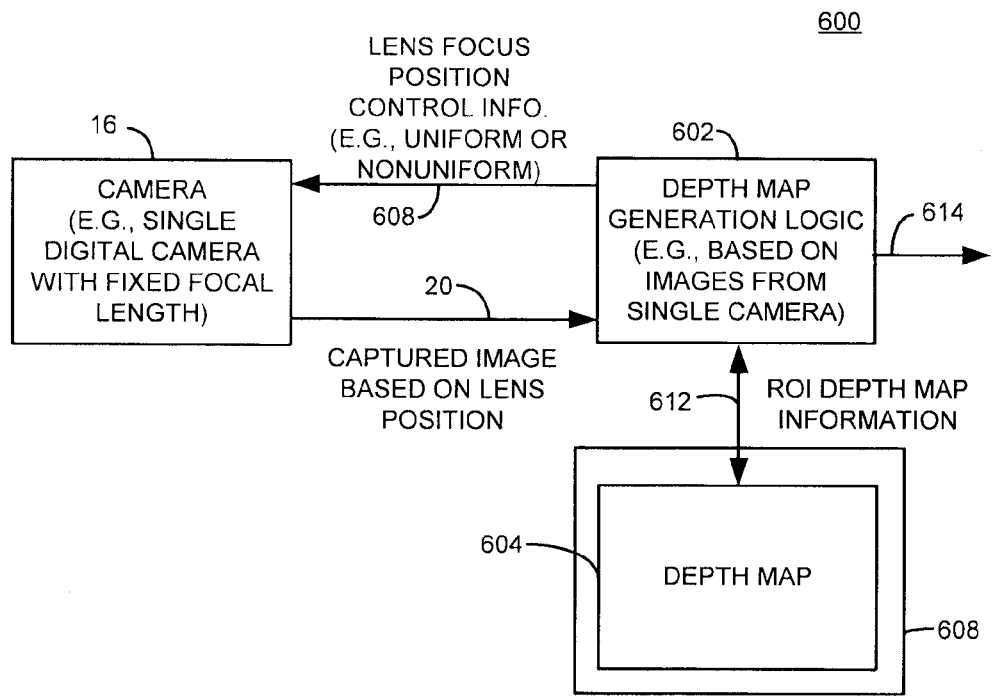
FIG. 6 is a block diagram illustrating one example of an apparatus employing depth map generation logic in accordance with one example set forth in the disclosure.
Figure 7:
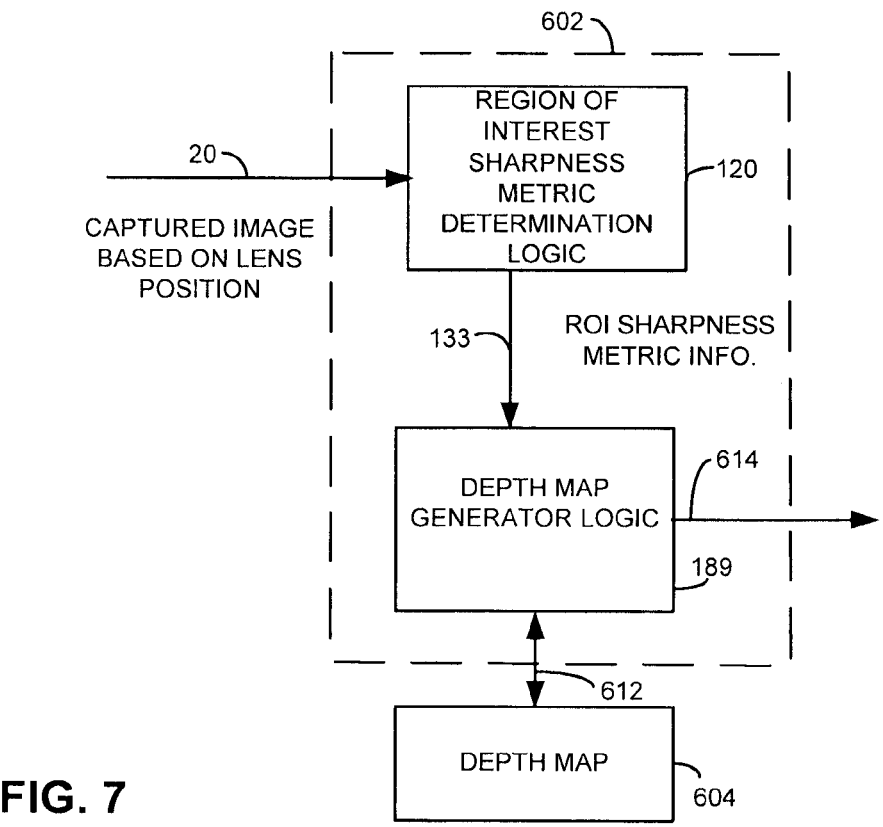
FIG. 7 is a block diagram illustrating one example of depth map generation logic in accordance with one example set forth in the disclosure.

FIG. 6 illustrates another embodiment of an apparatus 600 that employs depth map generation logic 602 that is operative to generate a depth map 604 based on regions of interest of images captured by a single camera 16, such as a single camera having a lens with a fixed focal length, or any other suitable single camera. The depth map 604 may be stored in memory 608 which may be cache memory, frame buffer memory, or any other suitable memory as desired. The depth map generation logic 602 also provides lens position control information 608 to control lens position settings of the camera that is based on either uniform or nonuniform lens position data. The lens control operates in a manner as described above except that when uniform position data is stored in memory, for example, this information is used to control lens positions and obtain corresponding frames of information at those lens positions as opposed to nonuniform lens positions. As such, the depth map generation logic 602 also includes lens position control information generation logic similar to that described above with respect to the auto focus control operation. Referring also to FIG. 7, the depth map generation logic 602 determines focus metric information 133 for each region of interest using for example image sharpness metric logic 120. For example, if a frame is divided into 25 areas, each area is considered a region of interest and hence 25 metrics are calculated (one for each region of interest). The depth map generation logic 602 determines an optimal lens position for each of the regions of interest, based on the focus metric information obtained from all relevant captured frames to generate the depth map 604 and as such, the depth map is based on the focus metric information 133 from multiple frames. As such, a single camera is used to capture a number of images at different lens positions and each of these images is divided into regions of interest. Focus metric information is then generated for each of the regions of interest in each frame and the highest metrics from each frame are used to populate the depth map 604. As such, the depth map generation logic 602 provides region of interest depth map information 612 to populate the depth map 604. The region of interest depth map information may be, for example, a value on a per-region of interest basis and/or other information as described below.

The apparatus 600 includes memory 608 as noted above that contains the lens position data and it also includes logic to perform the image generation operation based on the generated depth map. For example, the depth map generator logic 189 generates image operation control information 614 which, for example, may control a flash operation so that a camera flash is used or not used to take a final image (see FIG. 4). As another example, the image generation operation may be the controlling of a color processing operation by, for example, the video upper processor or any other suitable color processing circuit. Any other suitable image generation operation may also be controlled based on the depth map information.

Figure 8:
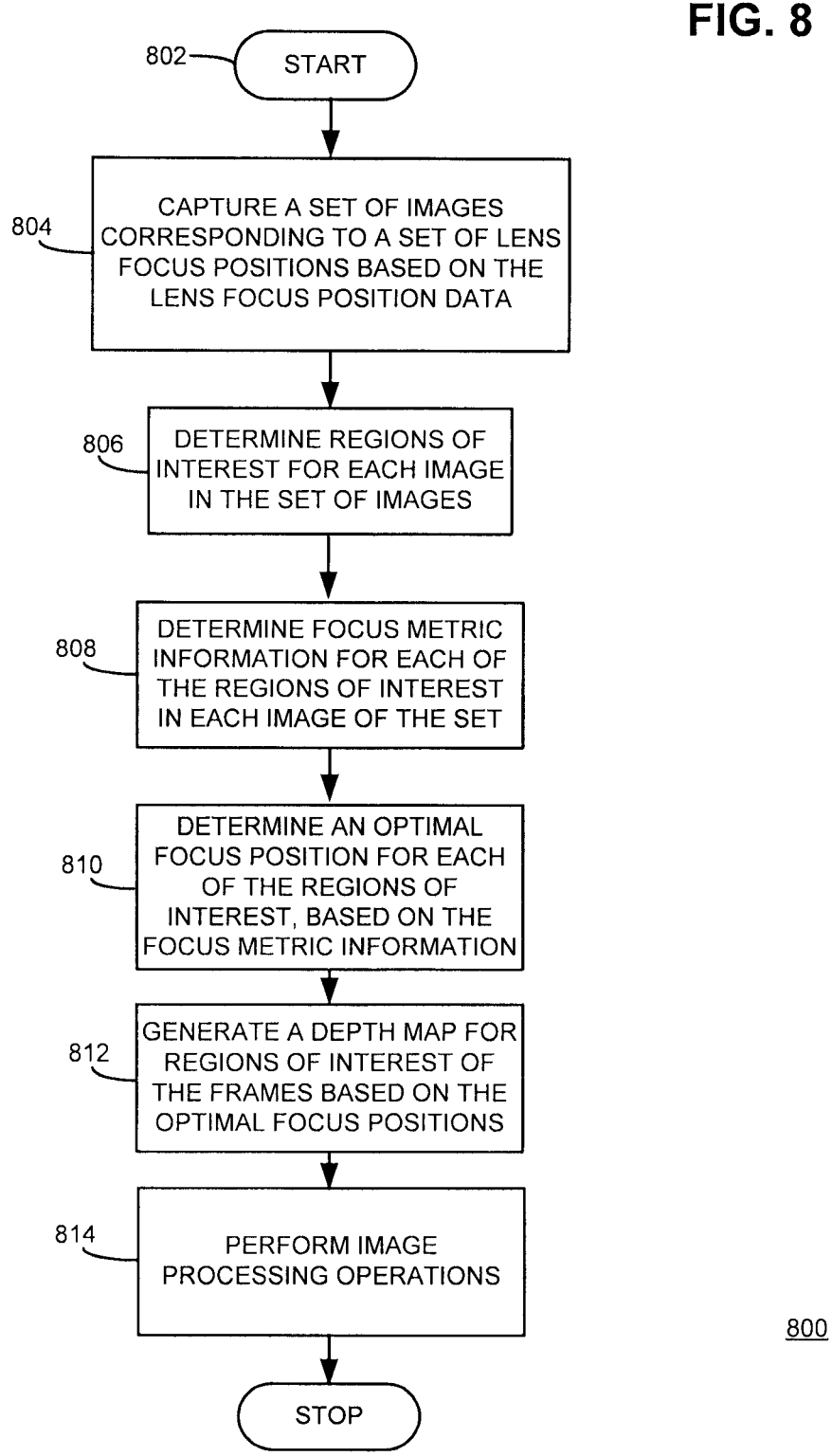
FIG. 8 is a flowchart illustrating one example of a method for improving digital camera image generation in accordance with one example set forth in the disclosure.

FIG. 8 illustrates one example of a method of image processing to generate a depth map 604 that begins in block 802 and as shown in block 804 includes capturing, using a single digital camera, a set of images corresponding to a set of lens positions based on lens position data. Capturing the set of images (block 804) corresponding to the set of lens positions includes capturing an image at a first lens position, selecting a next lens position selected from the set of lens positions, capturing a next image at the next lens position and capturing additional next images at additional next lens positions until the set is empty. As shown in block 806, the method includes determining regions of interest for each image in the set of images. As noted above, these operations are preferably done in a sequential manner wherein each frame is obtained and the regions of interest for that frame are generated and then compared to previous metrics of corresponding regions of interest in the depth map and storing in the depth map the highest metric for a given region of interest. As shown in block 808, the method includes determining the focus metric information for each of the regions of interest in each image of the set as noted above. As set forth in block 810, the method includes determining an optimal lens position (e.g., lens positions at highest metric) for each of the regions of interest based on the focus metric information from a subset or all of the frames that were obtained. As shown in block 812, the method includes generating the depth map for the regions of interest of the frames based on the optimal lens positions that were used to obtain the captured set of images. As shown in block 814, once the depth map has been generated, it can be used to perform image processing operations, such as activating a flash, disabling a flash, selecting a color enhancement operation for the final image to be used, or any other suitable image processing operation.

Figure 9:
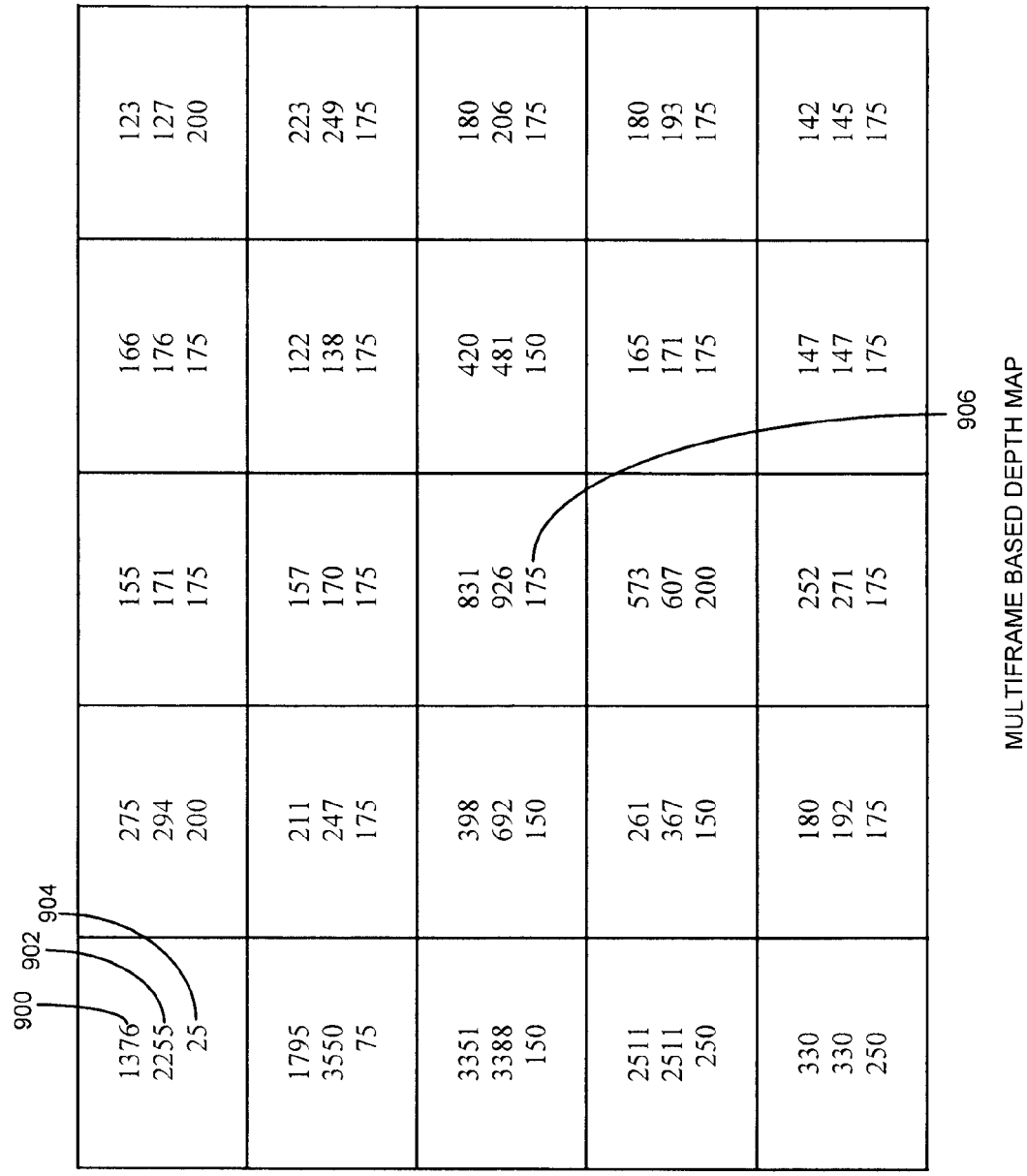
FIG. 9 illustrates one example of a data used to generate a depth map derived from multiple images in accordance with one example set forth in the disclosure.

FIG. 9 illustrates one example of data generated and used to produce a depth map. In this example, the data includes a best lens position for each ROI. This lens position information is used to determine the distance for a depth map based on the data (stored) shown in FIG. 12. However, it will be recognized that any suitable information may be stored therein. As shown, there is a 5×5 region of interest array that uniformly covers the camera's field of view. In this example, the results are from a working distance of about 6 meters. The arrays are taken at a lens position of 250 and three numerical values are displayed for each region of interest. In this example, value or metric 900 represents a focus sharpness metric at lens position 250. Metric 902 represents the optimal/maximum focus metric value achieved for the region of interest from all images evaluated and value 904 represents the optimal lens position corresponding to the highest image sharpness metric value. The center of the field of view, such as region of interest 906 is used, for example, to focus the camera for the final image. However, other regions of interest may be used that have a high image sharpness metric value 900 may be used instead of a center region of interest for the camera to focus during the final image. This depth map provides a coarse depth map that shows a best overall lens position at 175 based on the center region of interest 906 and the majority of regions of interest around the center region of interest 906. A generated depth map 604 (example shown in Table II) can be effectively used for improving various processes. For example, it can be determined that in the case of target tracking, as long as the target is beyond a certain distance such as 60 cm, the lens position need not be adjusted even if the target is moving toward or away from the camera. In addition, as noted above, the decision as to whether or not to use a flash may also be used based on the depth map. Other processes can also be modified or utilized based on the depth map as desired. As also shown in block 814, the method includes controlling the lens to focus on a particular region of interest for a final image capture based on its best focus position.

Figure 12:
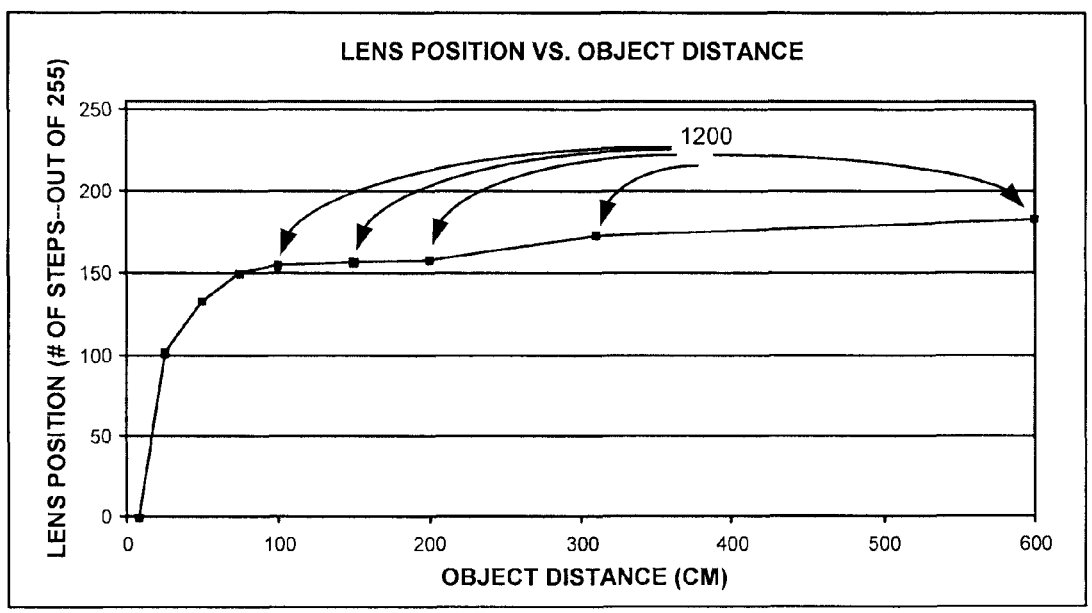
FIG. 12 illustrates one example of position data that may be used to generate a depth map in accordance with one example in the disclosure.

Depth-map generation is done without using any additional sensors (range sensors, time-of-flight sensors, phase-detection sensors), devices (e.g., stereo camera system), and structured lights (e.g., structured rectangular grids laser). To generate a depth map, the relationship between the lens positions and object distance is used. This can be generated for a given cell-phone camera model in advance and can be saved as a Look-Up Table (LUT) to be used during camera operation. FIG. 12 shows this relationship for the camera specified above. The points shown in FIG. 12 are stored in memory and points between the stored points can be interpolated as desired.

Depth-map generation is generated for a given scene as follows:
 The camera field-of-view (FOV) is divide to a set of rectangular regions of interest (ROIs): For example, 8×6 ROIs.
 (a) A set of n images are captured as the lens position is changed from position "0" to position "255" (assuming a total of 256 lens positions). 8 non-uniform (as defined above) or 11 uniform lens positions can be used.
 (b) Based on the set of n estimated focus-metric values (corresponding to n captured images) for each ROI, an optimal lens position (corresponding to the best focus) is determined for each ROI.
 (c) Using the relationship between lens positions and object distances (available as for example a LUT), depth (or Z distance) for each ROI can be estimated and the overall depth map is then is generated.
The level of fineness or coarseness of the generated depth map depends on the following factors:

(a) Number of regions-of-interest (ROIs) defined within the camera field of view (FOV): This determines the depth-map resolution in the XY (image) plane.
 (b) Number of captured images (corresponding to the number of lens positions): This determines the depth-map resolution in the Z direction (depth/Z-distance resolution).

An example for a coarse depth map is shown below in TABLE II:

| 16 | 8  | 8  | 8  | 8  | 80 | 80 | 80 |
|----|----|----|----|----|----|----|----|
| 21 | 80 | 80 | 80 | 80 | 80 | 80 | 80 |
| 80 | 80 | 80 | 80 | 80 | 80 | 80 | 80 |
| 80 | 80 | 80 | 80 | 80 | 80 | 60 | 60 |
| 80 | 80 | 80 | 80 | 60 | 60 | 50 | 50 |
| 80 | 80 | 80 | 80 | 20 | 20 | 50 | 50 |

As is seen from this depth map, a majority of ROIs are at about 80 cm. More specifically, the center zone in the field of view of the camera is at about 80 cm.

In this case, since the center zone is relatively close to the camera, a flash/no-flash selection is facilitated as follows: a flash should be used under low-light condition.

As shown in FIG. 9, a best lens position for each ROI is shown. This lens position is used to determine the distance based on the data points in FIG. 12 that are stored. In this example the quantity and size of each region of interest is predefined and is shown here to be a quantity of 25 and the size of each region of interest is the same. However, different quantities and different sizes of regions may also be employed such as smaller regions around the center of the field of view and larger regions around the perimeter or vice versa or any other suitable configuration. In addition, determining the optimal lens position for each of the regions of interest based on the focus metric information includes in this example, determining focus metric information for each region of interest for a captured image, determining a next focus metric information for each region of interest and a next image captured at a next lens position determining additional next focus information for each region of interest in additional next images at next lens positions until the set of lens positions is empty. As this is occurring, each subsequent method includes comparing the focus metric information for each region of interest and each captured image to a previous captured region of interest and a previous captured image and storing the better or higher metric for the particular region of interest in the depth map. As such, the contents of the depth map are updated such that less sharp regions of interest are replaced with metrics for higher sharpness metrics for the corresponding regions of interest until all images of the set have been evaluated. The depth map although shown to include multiple pieces of information may simply store the set of optimal lens positions for each regions of interest of an image.

Figure 10:
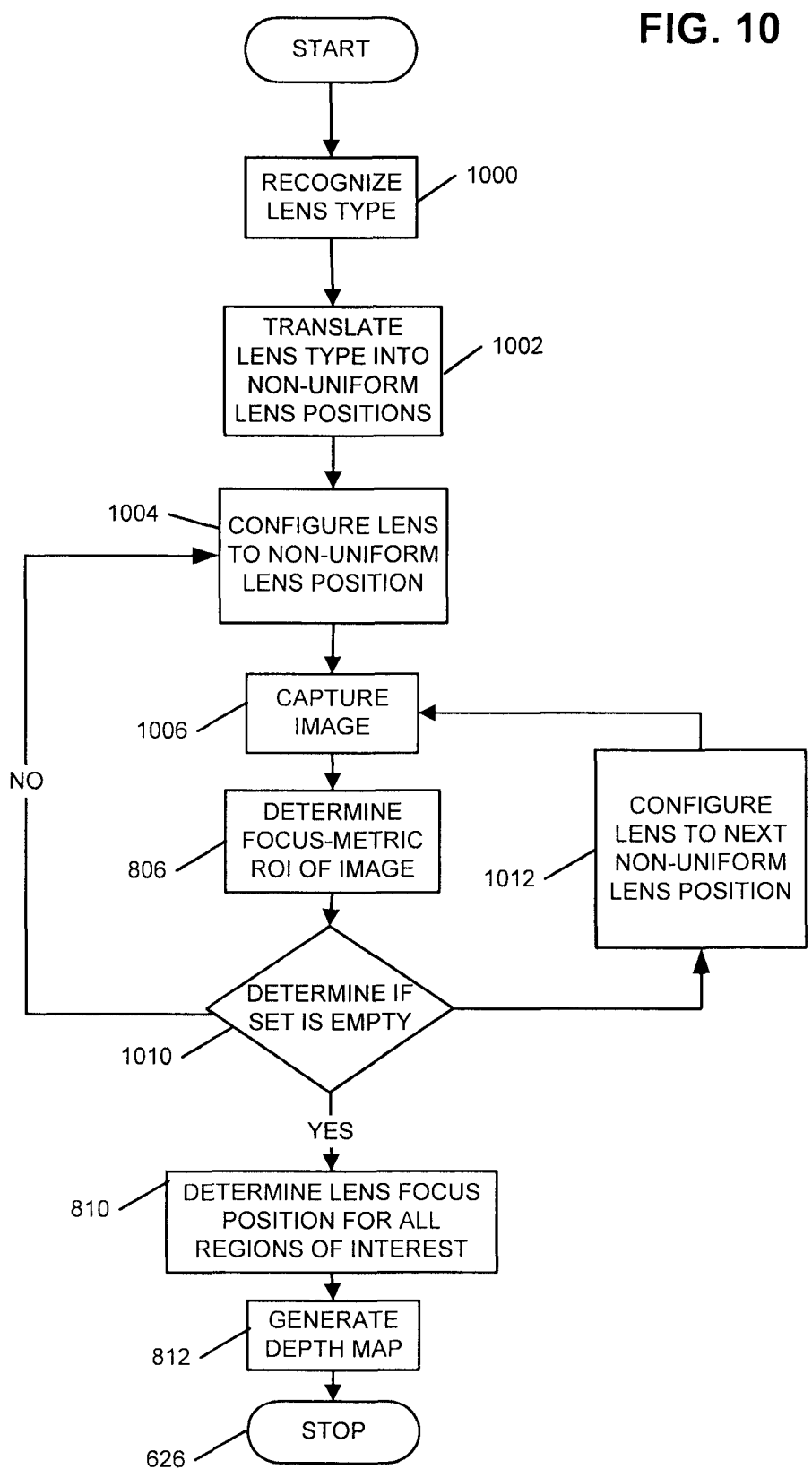
FIG. 10 is a flowchart illustrating one example of a method for improving digital camera image generation in accordance with one example set forth in the disclosure.

FIG. 10 illustrates a method for generating the depth map using non-uniform lens positions. In this example, the depth map generation logic 602 recognizes the specific lens type 1000 of the camera by, for example, accessing pre-stored manufacturing data, via a programmable register in the apparatus. Once the lens type has been determined, the particular set of nonuniform lens position data may be accessed from memory using the lens type information. For example a look up table may be used to translate the lens type data into lens positions.

Once the particular set of nonuniform lens position data has been identified, the method is similar to that described above with respect to using the uniform lens position information. For example, as shown in step 1004, the method includes configuring the lens or moving the lens to a nonuniform lens position based on the nonuniform lens focal position data. As shown in step 1006, the corresponding image is then captured and focus sharpness information 133 is then determined for regions of interest in the image as shown in block 806. As shown in block 1010, the method includes determining if all of the lens positions have been used to capture an image. If not, the method includes, as shown in step 1012, to move the lens to the next position corresponding to a next lens position data point. However, if all of the images have been captured corresponding to the set of lens positions, the method includes determining the lens positions for all regions of interest as shown in block 810 for all images. This may include, for example, determining the sharpness information for each of the regions of interest of each image after each respective image has been captured and then overwriting the metric in memory if in the depth map if a higher metric associated with the same region of interest has been obtained. As shown in block 812 the method includes generating the depth map as described above.

Figure 11:
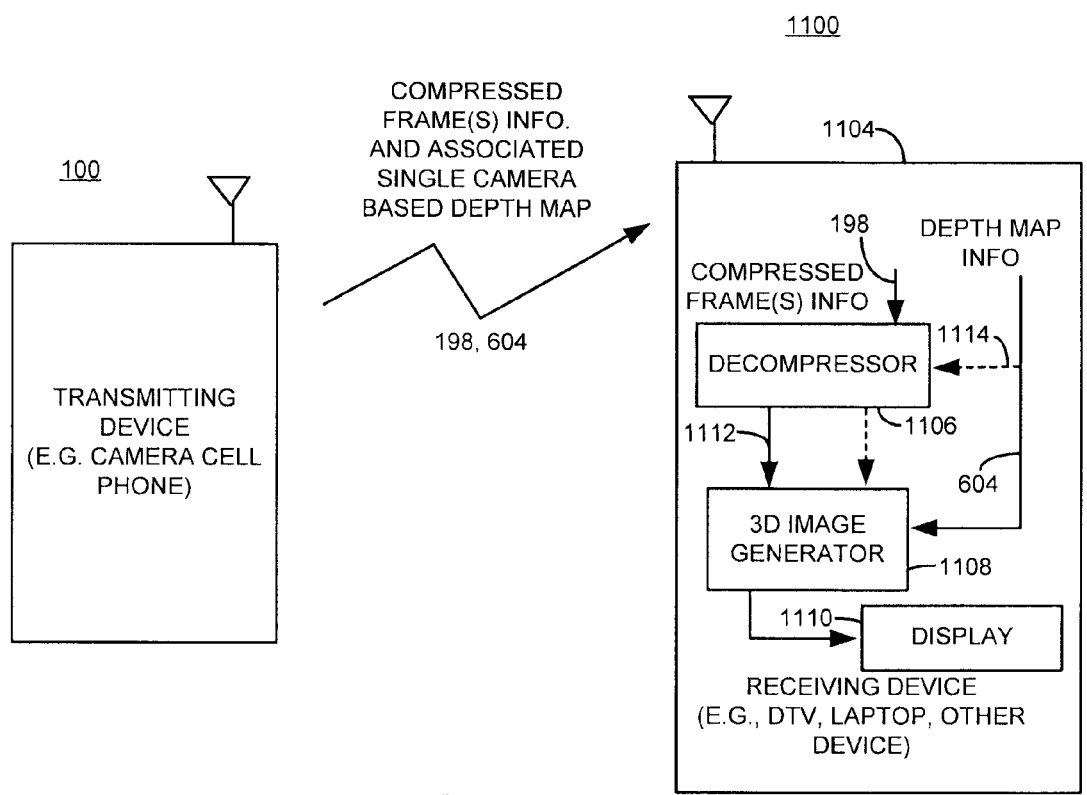
FIG. 11 is a block diagram illustrating one example of a system that communicates depth map information in accordance with the disclosure.

FIG. 11 illustrates one example of a system 1100 that includes a frame information transmitting device 1102, such as apparatus 100, and a frame information receiving device 1104. The transmitting device may be, for example, a camera cell phone or any other suitable device and the receiving device 1104 may be another camera cell phone, digital television, desktop computer, laptop, or any other suitable device. In this example, the transmitting device (which may also be a receiving device) compresses the final frame or portions thereof using, for example, a JPEG compression algorithm or any other suitable compression algorithm (such as MPEG for motion) using for example the JPEG encode logic 148 (see FIG. 4). The stored depth map 604 (i.e., data representing the data in TABLE II) and encoded frame 198 is then transmitted for communication to the receiving device 1104. This may include, for example, communicating the information wirelessly, through a network such as the Internet, or in any suitable manner. In addition, the compressed frame information may be a compressed complete frame, or compressed lines of a frame, or information for multiple frames or any other suitable compressed frame information. By using a much higher number of ROIs and much higher number of lens positions, a depth map may be created with much higher resolutions along all three XYZ axes. This may be used to generate a 3D image data. The depth map data can be attached to the compressed or non-compressed 2D image data and then together can be transmitted.

The receiving device 1104 includes a corresponding decompressor 1106, a 3D image generator 1108 and if desired, a display 1110. In operation, the receiving device receives the compressed frame information 198 and corresponding depth map 604 and decompresses the compressed frame information 198 using a corresponding decompression algorithm corresponding to compression algorithm used to compress the information. The decompressed frame information 1112 is then provided to a 3D image generator such as a 3D graphics processor or any other suitable structure along with the depth map information 604. As shown by dashed arrows 1114 the depth map may also be compressed and then decompressed for use by the 3D image generator 1108. The 3D image generator may then use the decompressed frame information and depth map information to generate a 3D image based on this information. The depth map 604 is a single camera based depth map 604 as described above wherein a single camera is utilized to take a sequence of frames based on uniform or nonuniform lens positions as noted above.

The above detailed description of the invention and the examples described therein have been presented for the purposes of illustration and description only and not by limitation. It is therefore contemplated that the present invention cover any and all modifications, variations or equivalents that fall within the spirit and scope of the basic underlying principles disclosed above and claimed herein.

What is claimed is:

1. A method for improving an auto-focus system of a digital camera comprising a lens of a particular lens type, the method comprising:

obtaining predetermined nonuniform lens position data from a memory, wherein the data comprises predetermined nonuniform lens positions corresponding to object distances from the camera at which an object is in focus for a lens of the particular lens type, wherein the predetermined nonuniform lens positions comprise lens positions spaced nonuniform distances apart, and wherein the predetermined nonuniform lens positions are the minimum number of lens positions that allow the lens to focus on objects at any distance of the full focus range from the digital camera;

moving the lens of the digital camera to a first of the predetermined nonuniform lens positions and determining first focus metric information;

moving the lens to a second of the predetermined nonuniform lens positions and determining second focus metric information; and focusing the digital camera by selecting a final lens position for the lens to optimize focus of the digital camera based on the predetermined nonuniform lens position data and the first and second determined focus metric information.

2. The method of claim 1 wherein the predetermined nonuniform lens position data is received from a passive component matrix.

3. The method of claim 1, wherein selecting the final lens position comprises:

selecting a preliminary predetermined nonuniform lens position based on the predetermined nonuniform lens positions;

capturing an image and determining focus metric information of the image corresponding to the preliminary lens position and storing the focus metric information as preliminary optimal focus metric information;

determining a next lens position based on the predetermined nonuniform lens positions;

capturing a next image and determining next focus metric information of the next image at the next lens position; and comparing the preliminary optimal focus metric information and the next focus metric information and retaining preferred metric information as new preliminary optimal focus metric information.

4. The method of claim 3, wherein the next lens position is determined by moving the lens in a determined search direction from the preliminary lens position.

5. The method of claim 3, wherein the preliminary predetermined nonuniform lens position is the first of the predetermined nonuniform lens positions, and the next lens position based on the predetermined nonuniform lens positions is the second of the predetermined nonuniform lens positions.

6. The method of claim 1, wherein the predetermined nonuniform lens position data is based on optical characteristics of a fixed focal length lens and comprises data representing at least eight lens positions including a hyper-focal length lens position which has the largest depth of field.

7. The method of claim 1, further comprising performing a neighborhood search at the final lens position.

8. A circuit of improving an auto-focus system of a camera comprising a lens of a particular lens type, wherein the circuit comprises auto focus control logic operative to:
obtain predetermined nonuniform lens position data from a memory, wherein the data comprises predetermined nonuniform lens positions corresponding to object distances from the camera at which an object is in focus for a lens of the particular lens type, wherein the predetermined nonuniform lens positions comprise lens positions spaced nonuniform distances apart, and wherein the predetermined nonuniform lens positions are the minimum number of lens positions that allow the lens to focus on objects at any distance of the full focus range from the camera;
alter the lens to a plurality of the predetermined nonuniform lens positions to determine focus metric information; and
focus the camera and select a final lens position to optimize focus of the camera based on the predetermined nonuniform lens position data and the focus metric information.

9. The circuit of claim 8, wherein the memory comprises data representing a lookup table that further comprises the predetermined nonuniform lens positions, and wherein at least one of the predetermined nonuniform lens positions is based on a characteristic curve of the lens.

10. The circuit of claim 8 comprising:
focus metric logic operative to determine image focus metric information based on captured image pixel information;
the memory operative to store the focus metric information; and
comparator logic operative to compare existing focus metric information stored in the memory with new focus metric information.

11. The circuit of claim 8, wherein the auto focus circuit is operative to capture as a final image, an image at the final lens position and wherein the predetermined nonuniform lens position data is based on optical characteristics of a fixed focal length lens and comprises data representing at least eight lens positions including a hyper-focal length lens position which has the largest depth of field.

12. An apparatus comprising:
a camera having a focusable lens of a particular lens type;
a memory containing predetermined nonuniform lens position data, wherein the data comprise predetermined nonuniform lens positions corresponding to object distances from the camera at which an object is in focus for a lens of the particular lens type, wherein the predetermined nonuniform lens positions comprise lens positions spaced nonuniform distances apart, and wherein the predetermined nonuniform lens positions are the minimum number of lens positions that allow the lens to focus on objects at any distance of the full focus range from the camera;
auto focus control logic operative to configure the lens to a plurality of the predetermined nonuniform lens positions and to determine focus metric information, wherein the plurality of predetermined nonuniform lens positions and the nonuniform lens position data are determined prior to initiating the autofocus operation; and
a user interface circuit operative to focus the camera and activate the auto-focus control logic based on the focus metric information.

13. The apparatus of claim 12, wherein the apparatus is a handheld device.

14. The apparatus of claim 12, wherein the memory comprises data representing a lookup table that further comprises the predetermined nonuniform lens positions, and wherein at least one of the predetermined nonuniform lens positions is based on a characteristic curve of the lens.

15. The apparatus of claim 12, wherein the auto focus control logic comprises:
focus metric statistical logic operative to determine image focus metric information based on captured image pixel information;
the memory operative to store the focus metric information; and
comparator logic operative to compare existing focus metric statistical information stored in the memory with new focus metric information.

16. The apparatus of claim 12 further comprising
logic operative to control the lens to capture a set of images using a plurality of lens positions based on at least one of uniform lens position data or predetermined nonuniform lens position data; and
depth map generation logic operative to determine focus metric information for each of a plurality of regions of interest in each image of the set and determine an optimal lens position for each of the regions of interest, based on the focus metric information and generate a depth map based on the focus metric information.

17. The apparatus of claim 16 comprising logic operative to perform an image generation operation based on the generated depth map.

18. The apparatus of claim 17 comprising a compressor operative to compress frame information of a final frame and wherein the apparatus is operative to transmit the compressed frame information and corresponding depth map to a remote device.

19. The apparatus of claim 17, wherein the image generation operation comprises generating a 3D image based on at least the focus metric information for each of the plurality of regions.

\* \* \* \* \*